(12) United States Patent
Dordick

(10) Patent No.: US 7,926,192 B1
(45) Date of Patent: Apr. 19, 2011

(54) SCREEN ALIGNMENT TOOL

(76) Inventor: Scott D. Dordick, Glendora, CA (US)

( * ) Notice: Subject to any disclaimer, the term of this patent is extended or adjusted under 35 U.S.C. 154(b) by 138 days.

(21) Appl. No.: 12/470,288

(22) Filed: May 21, 2009

(51) Int. Cl.
*G01C 15/00* (2006.01)
(52) U.S. Cl. .......................................................... 33/286
(58) Field of Classification Search .................... 33/286, 33/533, 645, 263–266, 276–280
See application file for complete search history.

(56) References Cited

U.S. PATENT DOCUMENTS

| | | | |
|---|---|---|---|
| 4,222,175 A | 9/1980 | Bernicky | |
| 5,890,299 A | 4/1999 | Giordano | |
| 6,199,287 B1 * | 3/2001 | Rankila | 33/286 |
| 6,338,203 B1 * | 1/2002 | Strickland | 33/645 |
| 6,434,853 B2 * | 8/2002 | Pyburn | 33/647 |
| 6,631,565 B2 * | 10/2003 | Wu et al. | 33/645 |
| 7,308,766 B2 * | 12/2007 | Wallace | 33/371 |
| 2001/0032395 A1 * | 10/2001 | Pyburn | 33/647 |
| 2006/0207117 A1 | 9/2006 | Sobol | |
| 2008/0150889 A1 | 6/2008 | Stern et al. | |

* cited by examiner

*Primary Examiner* — Yaritza Guadalupe-McCall
(74) *Attorney, Agent, or Firm* — Richard S. Erbe

(57) ABSTRACT

The invention is a tool that may be attached to a computer display screen or built-in with a computer. The tool is mounted to a computer and provides a user with the ability to align the computer display screen with their eye so that the user's line of sight is perpendicular to the display screen, which is the optimal viewing angle for viewing a display screen. In a first embodiment of the invention, the tool includes an interface portion, which is where the tool is attached to the frame of the computer, either temporarily or permanently, and an alignment portion. The first embodiment of the alignment tool may be detached from one computer and used with another. The alignment portion includes a pair of alignment indexes, which, when lined up with the user's eye, ensures that the user is viewing the computer display screen at the optimal angle. In a second embodiment of the alignment tool, the tool is installed as original equipment on the computer. The second embodiment of the alignment tool includes a pair of alignment indexes and is movable between an open position and a closed position by a spring.

12 Claims, 12 Drawing Sheets

SCREEN ALIGNMENT TOOL

RELATED APPLICATIONS

Not applicable.

BACKGROUND OF THE INVENTION

1. Field of the Invention

The present invention relates to the field of computer accessories. In particular, the present invention relates to a tool for aligning the display of a computer at the optimal viewing angle for a user.

2. General Background and State of the Art

Personal computers have made many working and every day tasks much easier, to the point where nearly every office and every household has at least one computer. Over time, personal computers have continuously gotten lighter, more compact, faster, and more powerful. A notebook computer (also called a laptop or portable computer) provides the user with the convenience of being able to use the computer at almost any location generally with ready access to the Internet.

One problem with computers is knowing whether or not the user is viewing the display at the best possible angle. Ideally, a line of sight line from the user's eye to the display should be perpendicular to the plane of the display. For digital photographers, it is especially critical when they are working on digital photographs on a computer that the display screen is at the optimum angle for viewing.

When viewing digital photographs on a computer display, the brightness of the displayed image changes with the angle of the display in relation to the viewer's eye. While using a notebook computer, in particular, for working on digital photographs is quite convenient for a photographer, it is crucial that the images be viewed at the correct angle. With today's computers, even with calibrated display screens, it is difficult to know whether or not the user is viewing the images at the best possible angle.

Attempts have been made to provide a means to ensure that a user of a computer is viewing the display screen at the best angle. In particular, methods and devices to accomplish this task are disclosed in U.S. Pat. No. 5,890,299 (Giordano) and Published United States Applications Nos. 2006/0207117 (Sobol) and 2008/0150889 (Stern et al.). The methods and devices disclosed in these documents, however, are rather complicated and require significant modifications to a computer to use.

Thus, there is a need for an alignment tool for use with a computer display that is easy to use, compact, and interchangeable, in that can be used with any existing computer, or may be provided already attached to a new computer at the point of purchase.

There is also a need for an alignment tool for use with a computer display that does not require any modifications or additional software or ancillary equipment in order to be used for its intended purpose.

The alignment according to the present invention overcomes the problems of prior art devices and methods and provides further advantages, as will be described.

SUMMARY OF THE INVENTION

It is therefore an object of the present invention to provide an alignment tool for use with a computer display that can readily be used with virtually any existing computer.

It is a further object of the present invention to provide an alignment tool for use with a computer display that is easy to use.

Yet another object of the present invention is to provide an alignment tool for use with a computer display that may be provided as original equipment with a new computer.

Another object of the present invention is to provide an alignment tool for use with a computer display that does not require extensive modifications to an existing computer in order for it to be properly used.

Still another object of the present invention is to provide an alignment tool for use with a computer display that does not require any ancillary equipment or software installed with the alignment tool in order for it to be properly used.

These and other objectives are achieved by the present invention, which, in a broad aspect, provides an alignment tool for use with a computer display that allows for quick, easy and secure attachment of the tool to a side wall of virtually any computer display. In one embodiment of the invention, the alignment tool includes an interface portion that engages the frame of a computer display. The interface portion is attached to an alignment portion that includes a pair of alignment indexes that will be described shortly.

The alignment tool of the present invention may be attached to a computer by means of conventional methods, such as an adhesive, tape or hook and loop type fasteners, such as Velcro® strips. In a second embodiment of the alignment tool according to the present invention, the tool may be provided as original equipment with a new computer. In this second embodiment, the alignment tool according to the present invention may be attached to a spring activated attachment means to move the alignment tool as required for ease of packaging and transport while still allowing for ready use. When the display is disposed adjacent the keyboard, i.e., when a notebook computer is not in use and is configured for storage or transport, the alignment tool according to the second embodiment of the invention is contained in a receptacle in the frame of the display. When the computer is ready for use and the display is moved away from the keyboard, a tension spring causes the alignment tool to rotate from out of the receptacle to a position where it is ready for use.

As noted, the alignment tool according to the present invention includes a pair of alignment indexes on the alignment portion of the tool. In a first embodiment of the invention, a first index, which is disposed on one of three planar elements that make up the alignment portion of the alignment tool, is a slot that passes through the planar element. The second alignment index is preferably a pointer extending from a third planar element of the alignment portion. The first and third planar elements are preferably parallel to each other and connected by and to a second planar element. It should be noted those skilled in the art will understand that other configurations for the first index and second index may be used without departing from the scope of the invention. Such configurations could include one or two circles, lines, a pointer for the first index as well as the second index, a pair of slots, or a pair of parallel lines, to name a few possibilities.

The inventor has found that the alignment tool according to the present invention works best when the tool is positioned so that the first alignment index and the second alignment index are both in alignment with an imaginary reference line on one of the sides of the display frame, with the imaginary reference line being equidistant from the top and bottom of the display.

To use the alignment tool according to the first exemplary embodiment of the present invention, the user attaches the alignment tool to the computer frame so that the indexes are disposed equidistant from the top and bottom of the display screen. This position ensures that the alignment tool is centered with reference to the display screen. Once the alignment tool is in its proper position, the user rotates the screen while the viewer's eye looks at the first and second alignment indexes on the alignment tool. When the screen is positioned such that as the user sees the second alignment index (in the first exemplary embodiment, the pointer) is positioned at the center of the first alignment index (in the first exemplary embodiment, the slot), the plane of the front surface of the display screen is perpendicular to the user's line of sight and is in the best position for viewing images. In particular, the brightness of any digital photographs and other images on the display are at the desired level. The same method of use applies to using the alignment tool according to the present invention with a desktop computer.

To use the alignment tool according to a second exemplary embodiment according to the present invention, the user moves the display away from the keyboard. The alignment tool, which in this second exemplary embodiment is already attached at the proper position on the frame (centered between the top and bottom of the display screen), is rotated into position by the force of a spring. Once the alignment tool is in position, the user rotates the display screen while the viewer's eye looks at the first and second alignment indexes on the alignment tool. When the display screen is positioned so that as the user sees the second alignment index (in the second exemplary embodiment, the pointer) is positioned at the center of the first alignment index (in the second exemplary embodiment, the slot), the plane of the front surface of the display screen is perpendicular to the user's line of sight and is in the best position for viewing images.

Further objects and advantages of this invention will become more apparent from the following description of the preferred embodiment, which, taken in conjunction with the accompanying drawings, will illustrate, by way of example, the principles of the invention.

BRIEF DESCRIPTION OF THE DRAWINGS

The foregoing and other aspects and advantages will be better understood from the following detailed description of the exemplary embodiments of the invention with reference to the drawings in which.

DETAILED DESCRIPTION OF THE PREFERRED EMBODIMENTS OF THE INVENTION

Figure 1:
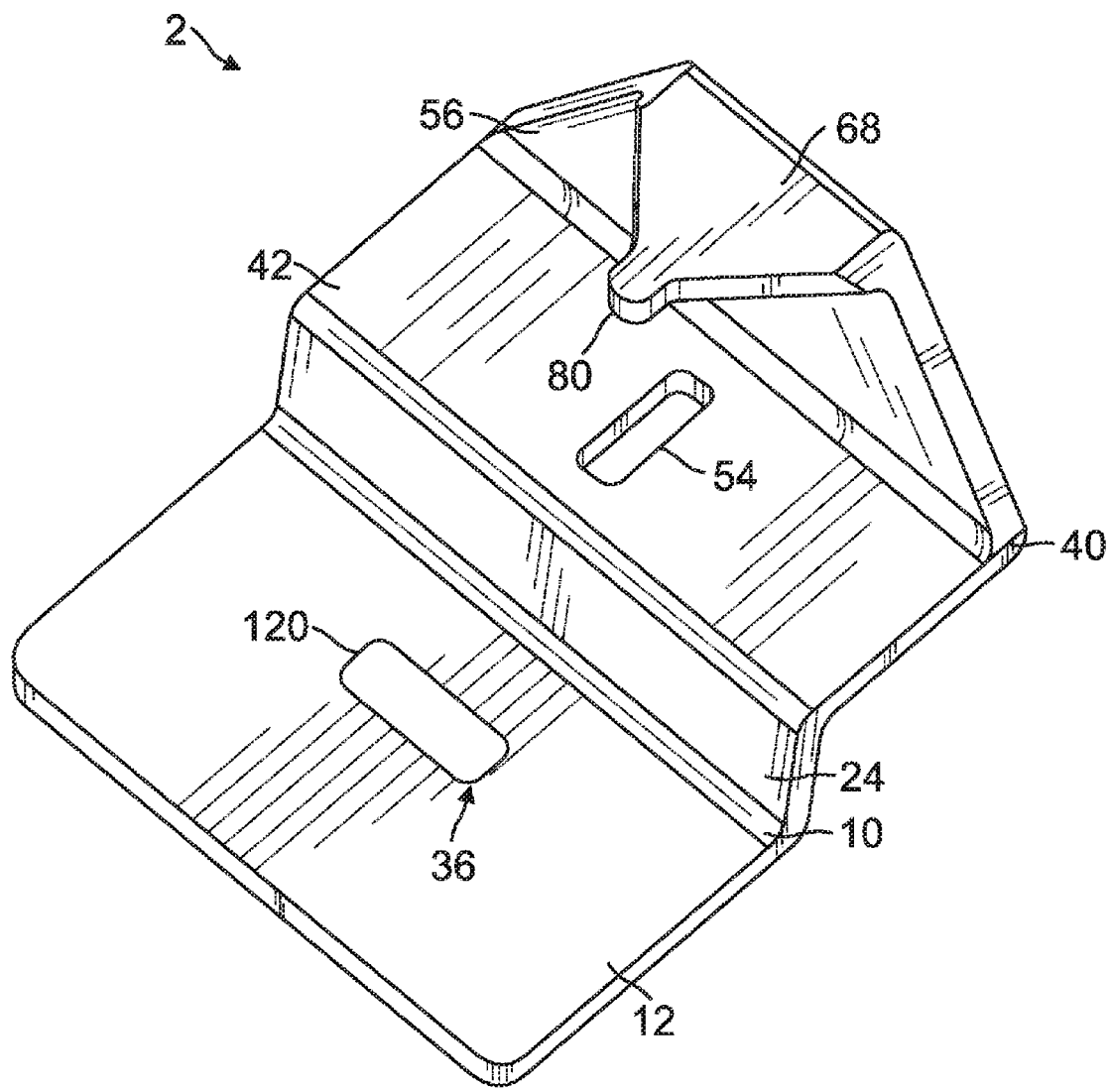
FIGS. 1 and 2 illustrate perspective views of a first exemplary embodiment of an alignment tool according to the present invention.
Figure 2:
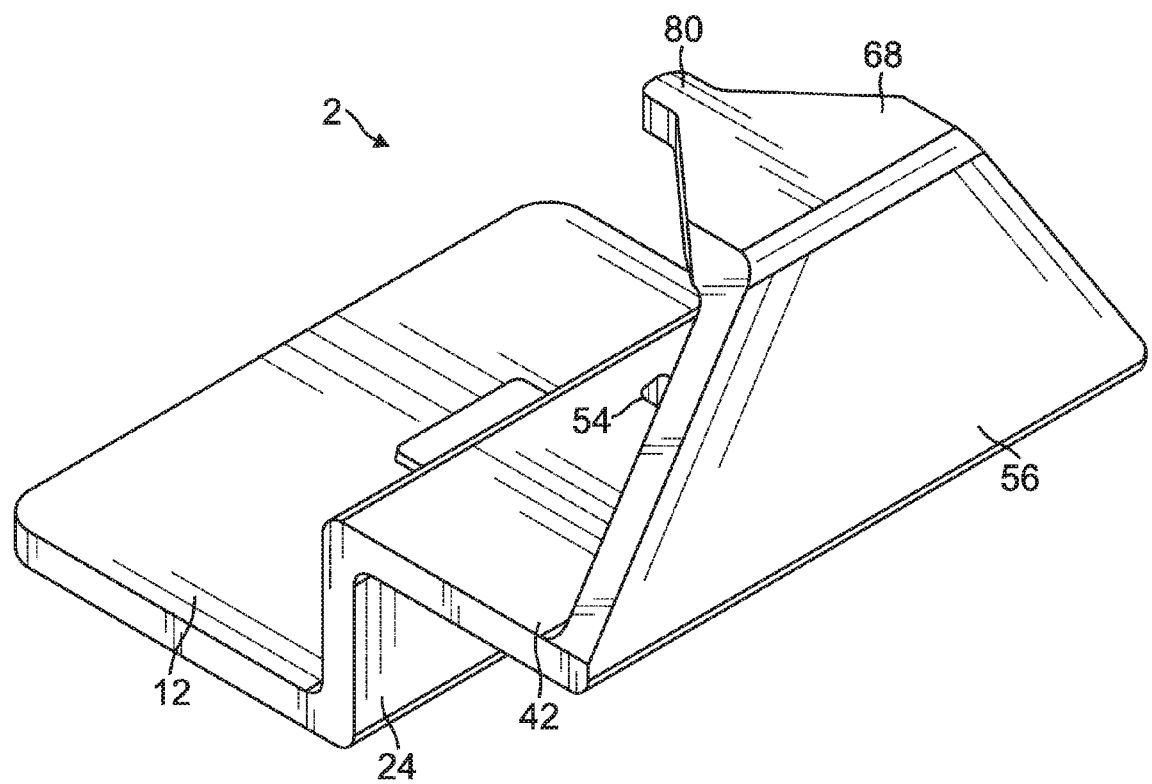
Figure 3:
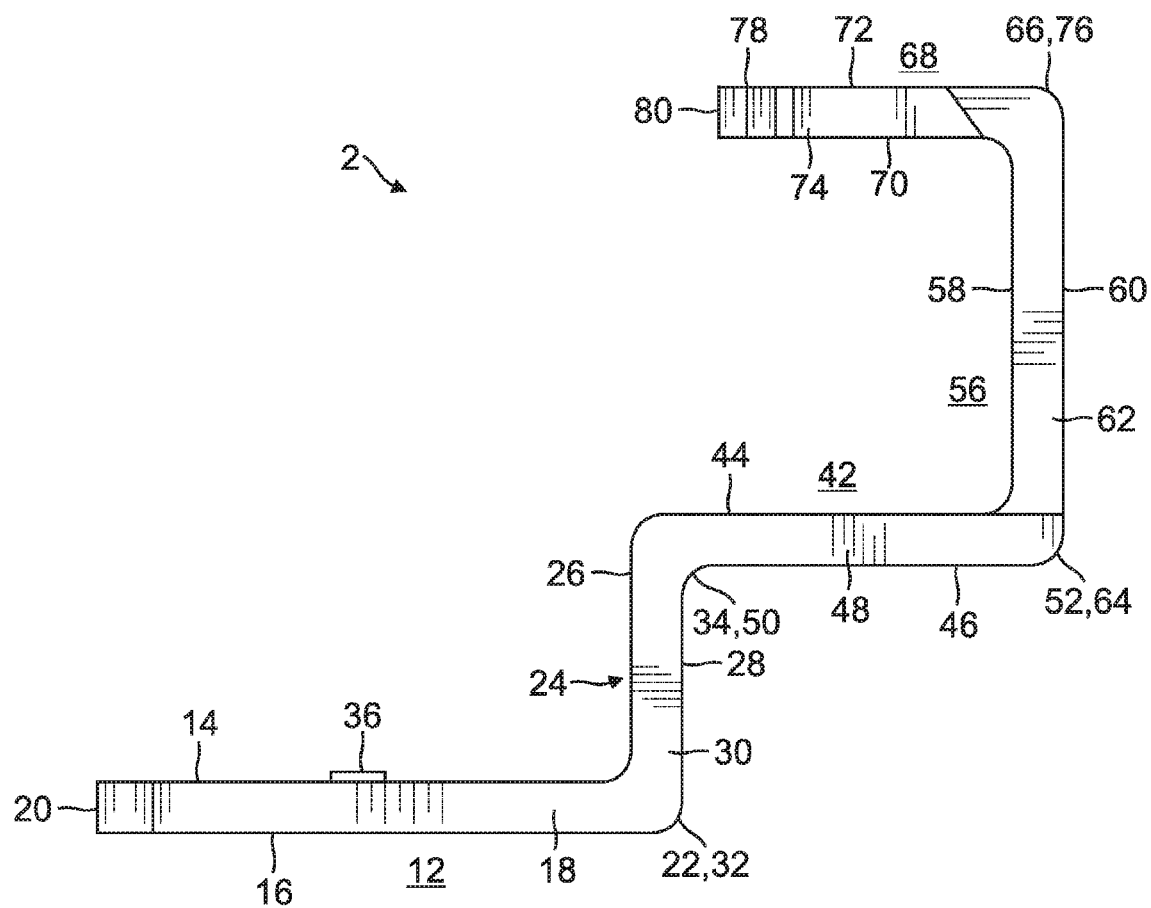
FIGS. 3 and 4 illustrate opposing side views of a first exemplary embodiment of an alignment tool according to the present invention.
Figure 4:
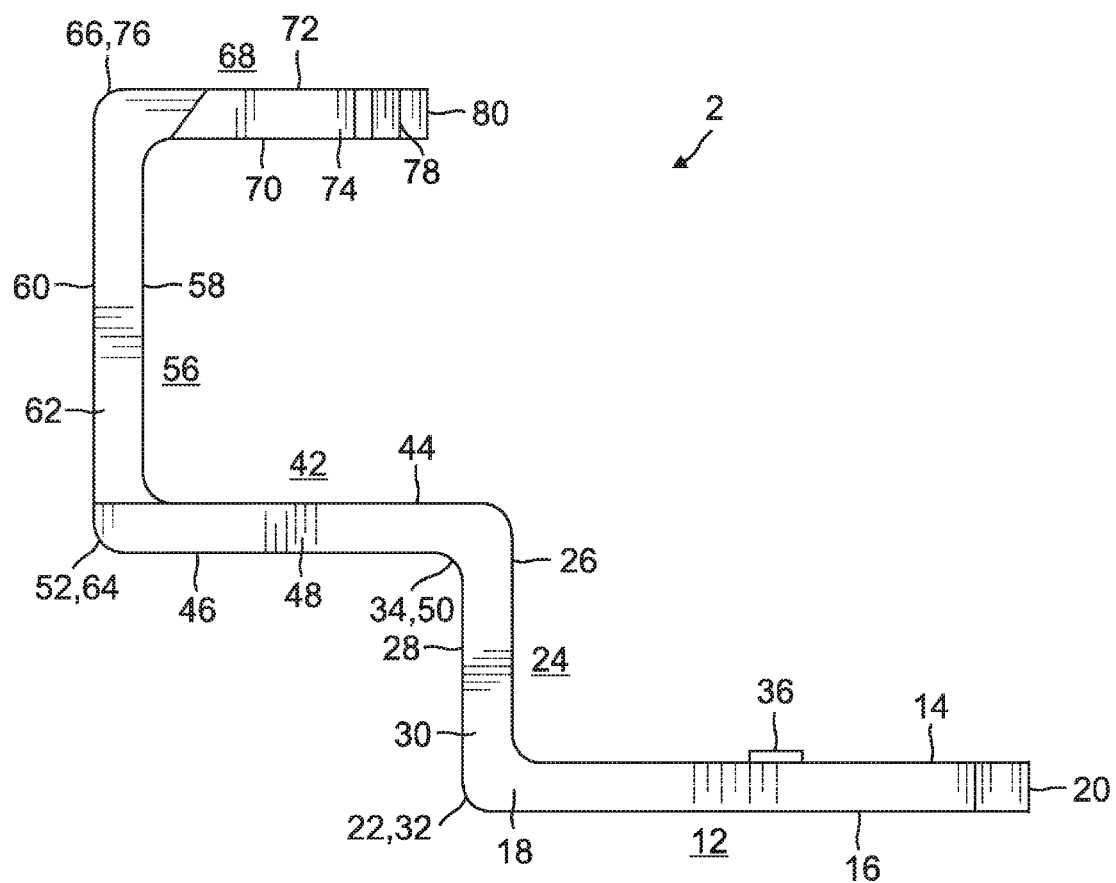
Figure 5:
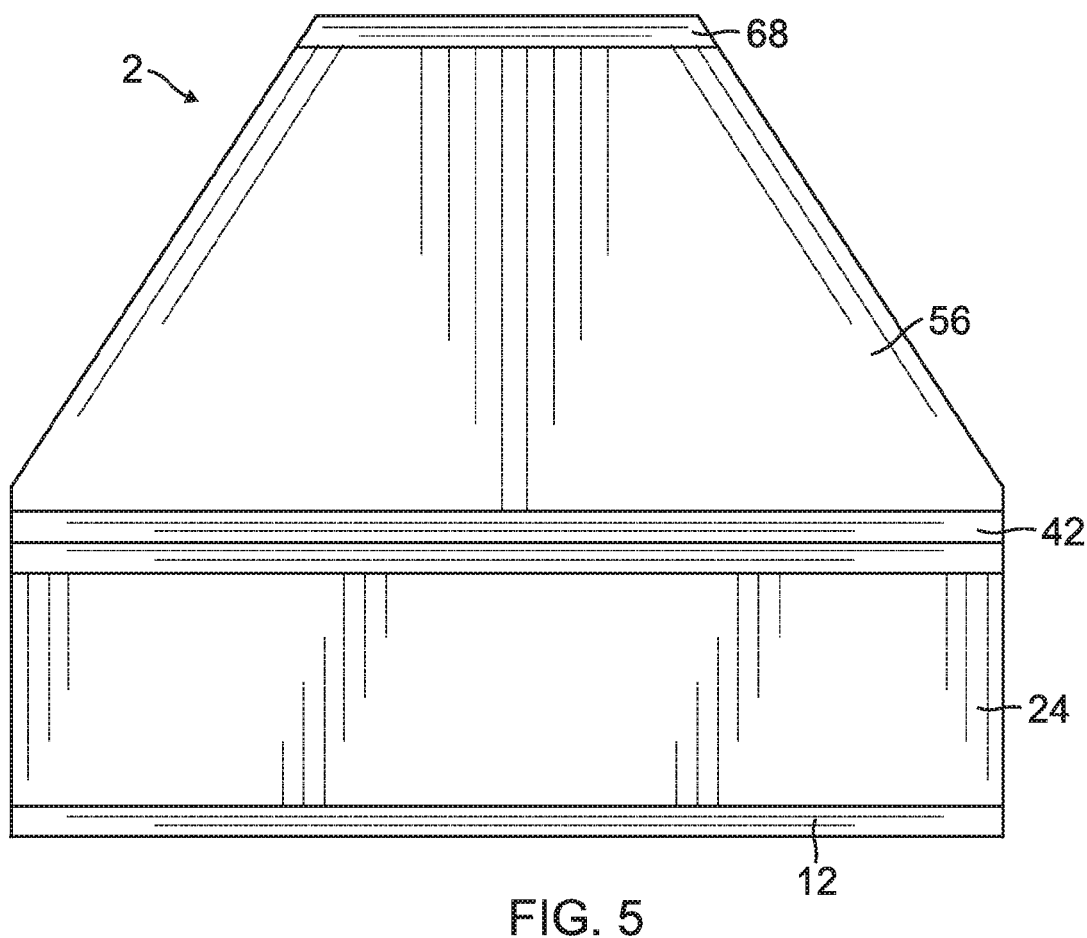
FIGS. 5 and 6 illustrate end views of a first exemplary embodiment of an alignment tool according to the present invention.
Figure 6:
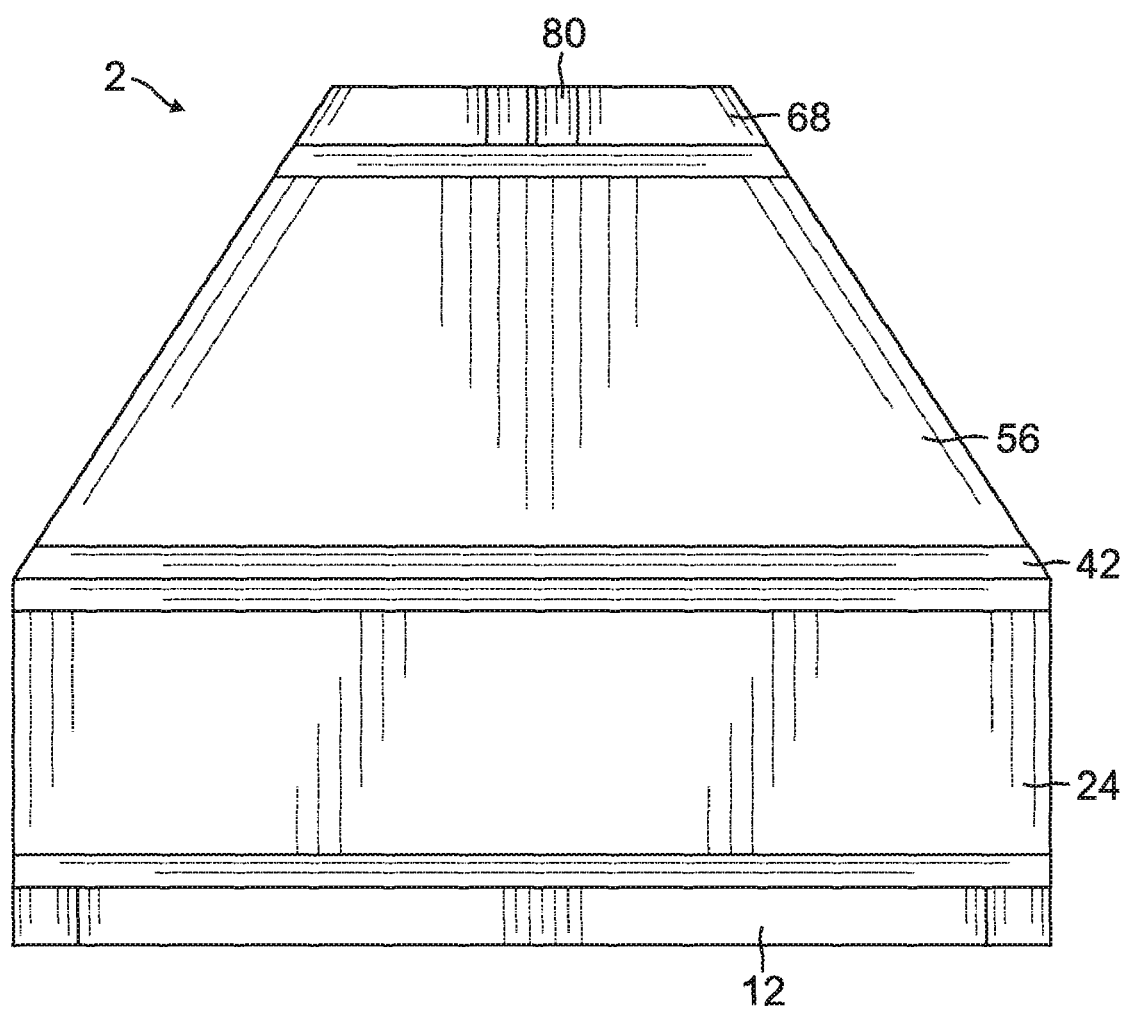

In the following description of the invention, reference is made to the accompanying drawings, which form a part thereof, and in which are shown, by way of illustration, exemplary embodiments illustrating the principles of the alignment tool of the present invention and how it may be practiced and assembled. It is to be understood that other embodiments may be utilized to practice the present invention and structural and functional changes may be made thereto without departing from the scope of the present invention.

A first exemplary embodiment of an alignment tool for use with a computer display according to the present invention is generally indicated by the numeral 2 and is best illustrated in FIGS. 1-8. Alignment tool 2 includes interface portion 10 and alignment portion 40.

Interface portion 10 includes a generally rectangular first wall 12, which includes top surface 14, bottom surface 16, a pair of opposed sides 18, first end 20, and second end 22, and generally rectangular second wall 24, which includes top surface 26, bottom surface 28, a pair of opposed sides 30, first end 32 and second end 34. First wall 12 is attached at second end 22 to first end 32 of second wall 24. Preferably, first wall 12 is disposed generally perpendicular to second wall 24.

Figure 10:
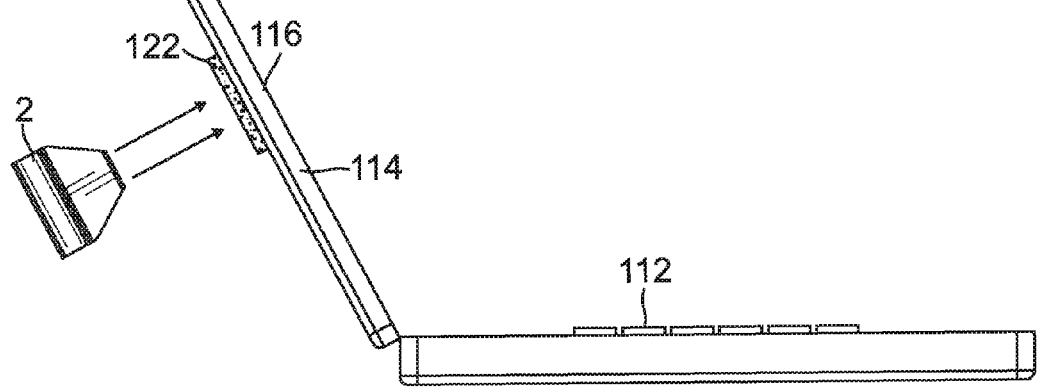
FIG. 10 illustrates a side view of a first exemplary embodiment of an alignment tool according to the present invention and how it is attached to a computer.

Interface portion 10 is configured to engage a side wall of a notebook computer when tool 2 is in use. In the first exemplary embodiment of the invention, attachment means 36 is disposed on interface portion 10. As illustrated in FIGS. 1 and 10, attachment means 36 includes attachment strips 120 and 122 made up of an adhesive or a hook and loop material, such as Velcro®.

Alignment portion 40 includes three planar elements, first planar element 42, second planar element 56, and third planar element 68 attached to each other. In the first exemplary embodiment of alignment tool 2 described herein, first planar element 42 is disposed generally parallel to third planar element 68. Second planar element 56 connects first planar element 42 to third planar element 68 and is preferably perpendicular to first planar element 42 and third planar element 68.

First planar element 42 is configured in a generally rectangular shape, although other shapes are possible for first planar element 42 without departing from the scope of the invention. First planar element 42 includes inner surface 44, outer surface 46, a pair of opposed sides 48, first end 50 and opposed second end 52. First planar element 42 also includes first alignment index 54, which in this exemplary embodiment of the invention is in the shape of a slot that extends through first planar element 42. First alignment index 54 may also be configured as a circle, a line, a cross or other shapes.

Second planar element 56 is configured in a generally rectangular shape, although other shapes are possible for second planar element 56 without departing from the scope of the invention. Second planar element 56 includes inner surface 58, outer surface 60, a pair of opposed sides 62, first end 64 and opposed second end 66. Second planar element 56 is attached at first end 64 to second end 52 of first planar element 42.

Third planar element 68 includes inner surface 70, outer surface 72, a pair of sloped converging sides 74, first end 76 and opposed second end 78. Extending from said second end 78 is second alignment index 80, which in the exemplary embodiment illustrated herein is a pointer. Those skilled in the art will recognize that other shapes for second alignment index 80 are possible, such as a circle, a line, a cross, or other shapes, without departing from the scope of the invention.

Figure 9:
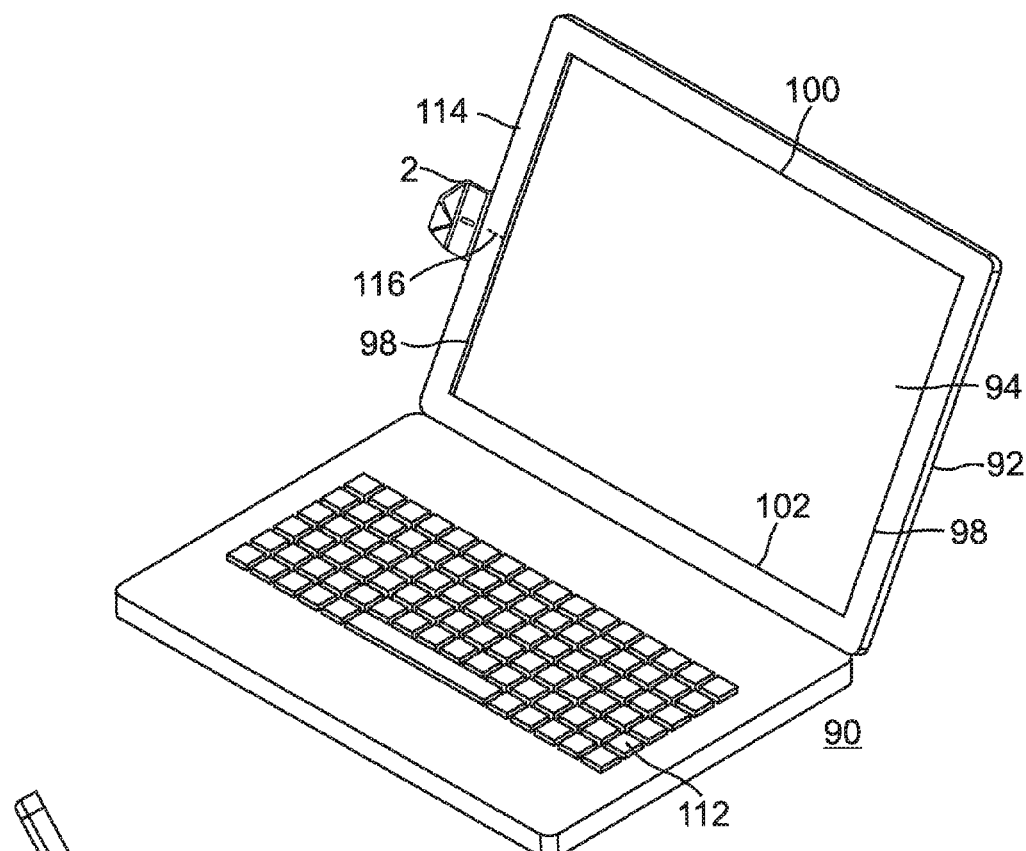
FIG. 9 illustrates perspective view of a first exemplary embodiment of an alignment tool according to the present invention attached to a computer.

FIGS. 9 and 10 illustrate alignment tool 2 attached to a notebook computer 90. It should be noted that alignment tool 2 may be used in conjunction with a desktop computer display screen as well as with a notebook computer. Computer 90 includes display 92 having display screen 94, a pair of opposed display screen sides 98, display screen top 100, display screen bottom 102, and frame 114. Computer 90 also includes keyboard 112. Alignment tool 2 is preferably mounted to a side wall 98 so that alignment indexes 54 and 80 are positioned equidistant from top 100 and bottom 102. An imaginary reference line 116 (shown in phantom lines) is located equidistant from top 100 and bottom 102, so user 106 positions alignment tool 2 so that first alignment index 54 is equidistant from top 100 and bottom 102.

Figure 7:
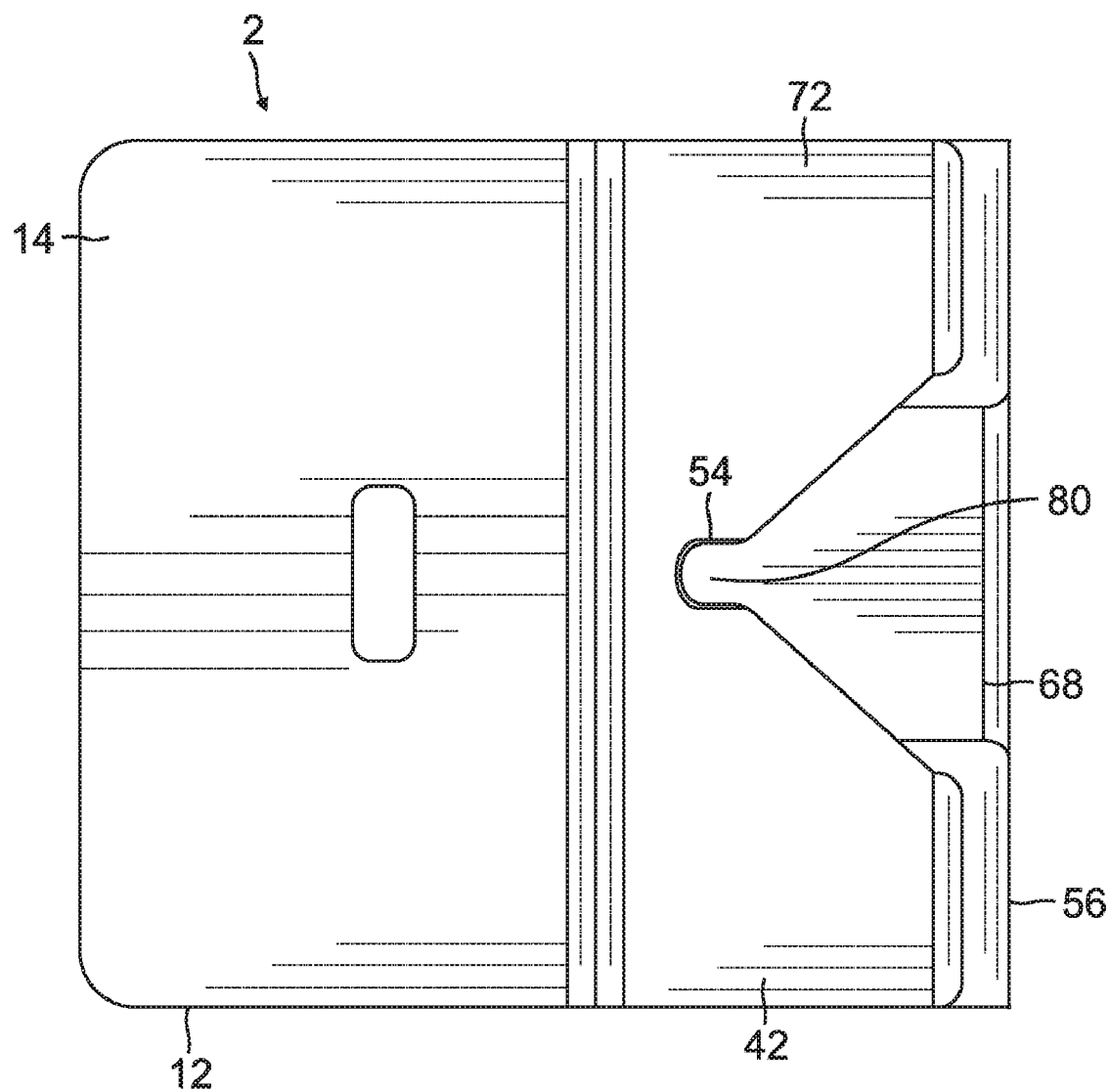
FIG. 7 illustrates a top view of a first exemplary embodiment of an alignment tool according to the present invention.
Figure 8:
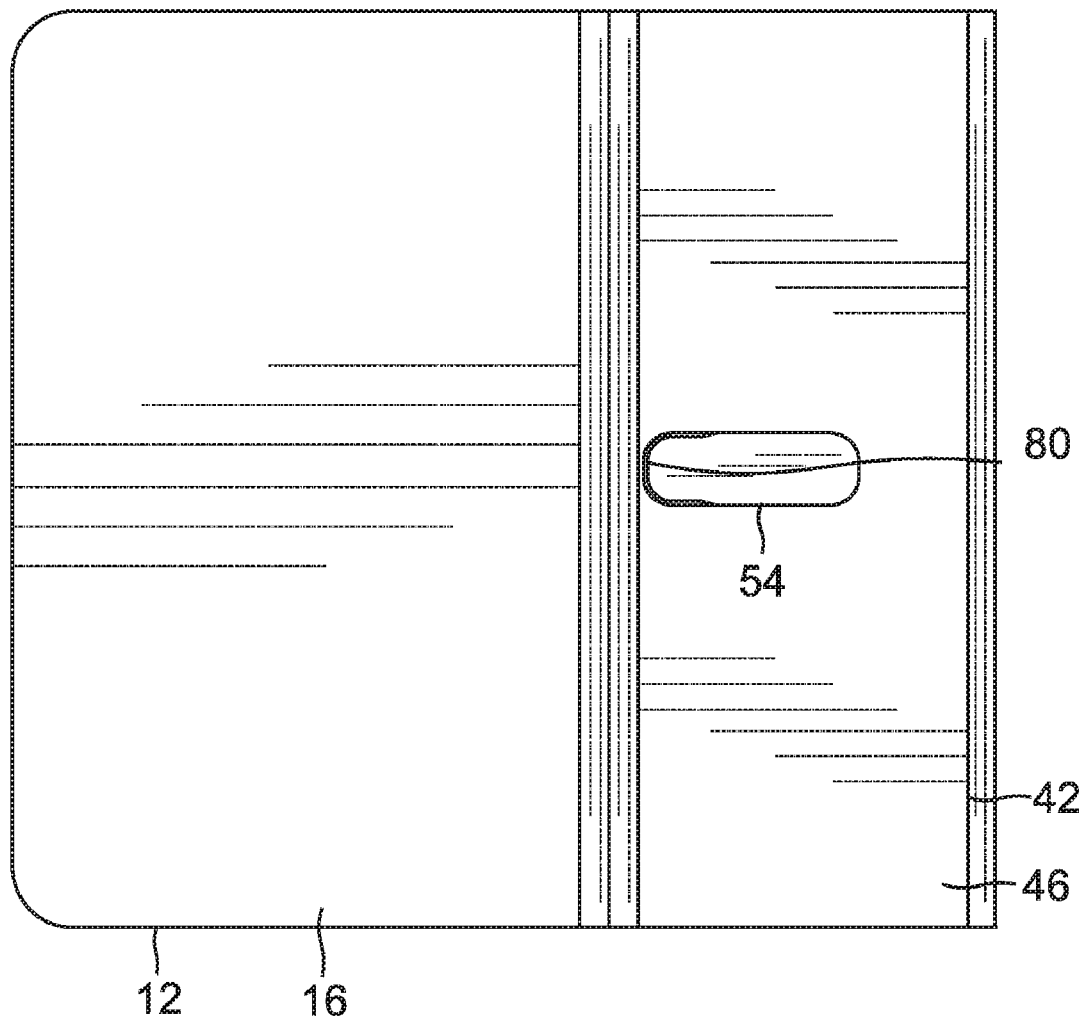
FIG. 8 illustrates a bottom view of a first exemplary embodiment of an alignment tool according to the present invention.
Figure 11:
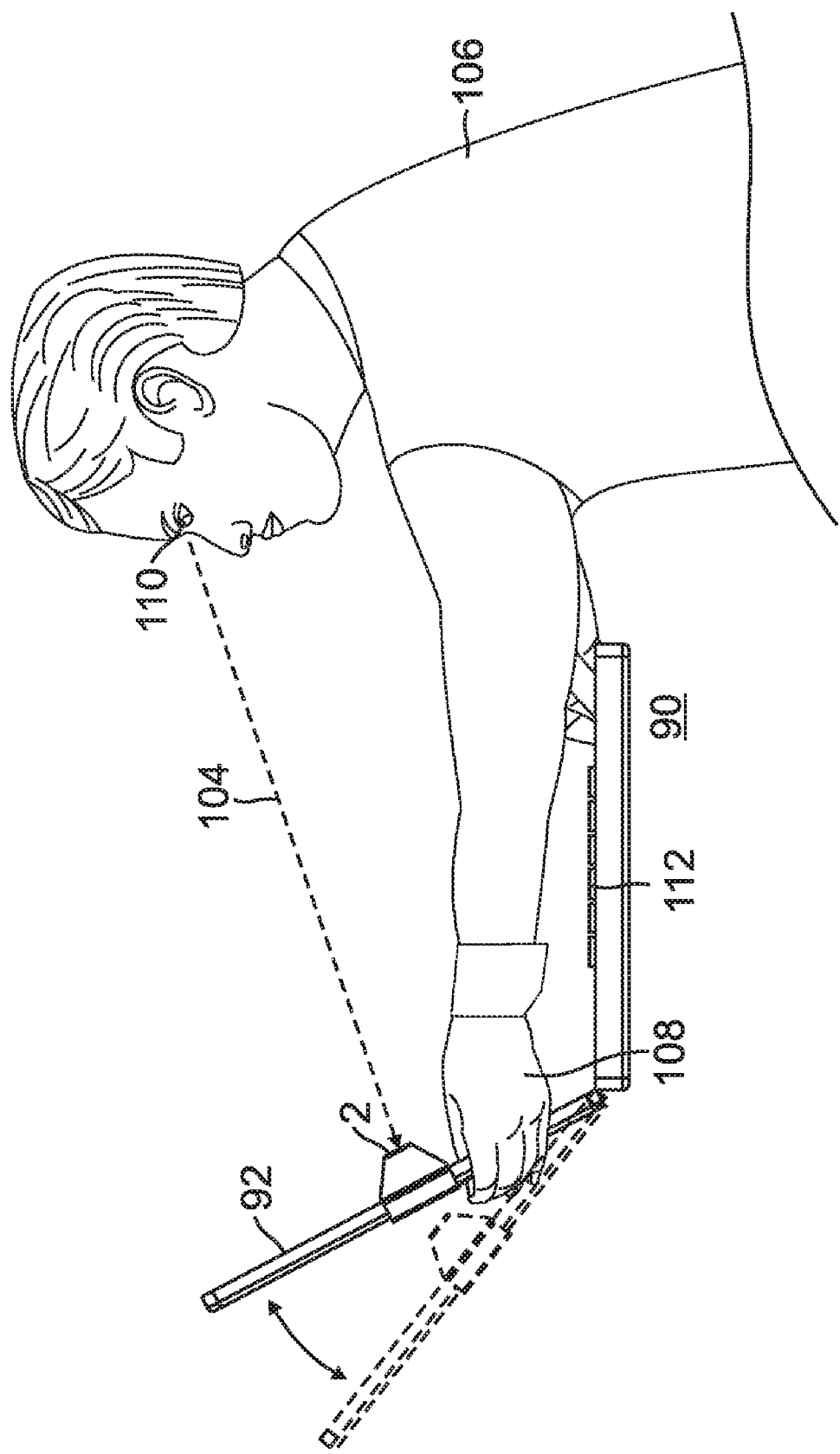
FIG. 11 illustrates a perspective view of a first exemplary embodiment of an alignment tool according to the present invention mounted on a computer and how a user adjusts the display for optimum viewing.

FIG. 11 illustrates how the alignment tool 2 is used by a user 106. With alignment tool 2 attached to display 92 as previously described, user 106 grasps display 92 with a hand 108 and rotates display 92. Line-of-sight-line 104 extends from user's eye 110 to alignment tool 2. When eye 110 sees second alignment index 80 centered on first alignment index 54 (as illustrated in FIG. 7) and reference line 116 along line-of-sight line 104, the plane of display 92 is perpendicular to line-of-sight-line 104 and display 92 is now in the optimal position for viewing. In particular, display 92 is now positioned such that any digital photographs viewed on display 92 show their proper brightness for further processing.

Figure 12:
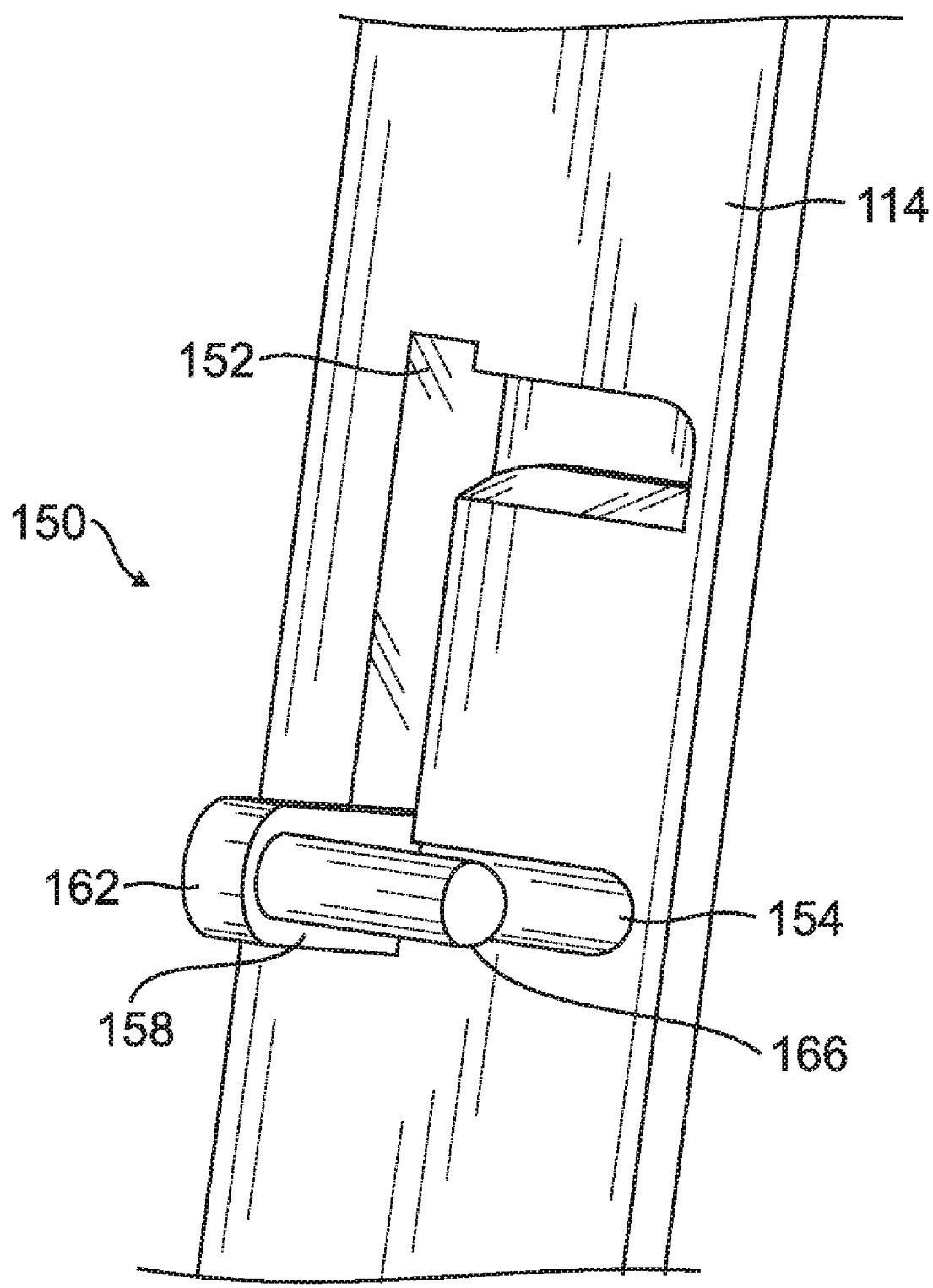
FIG. 12 illustrates a perspective view of a second exemplary embodiment of an alignment tool according to the present invention.
Figure 13:
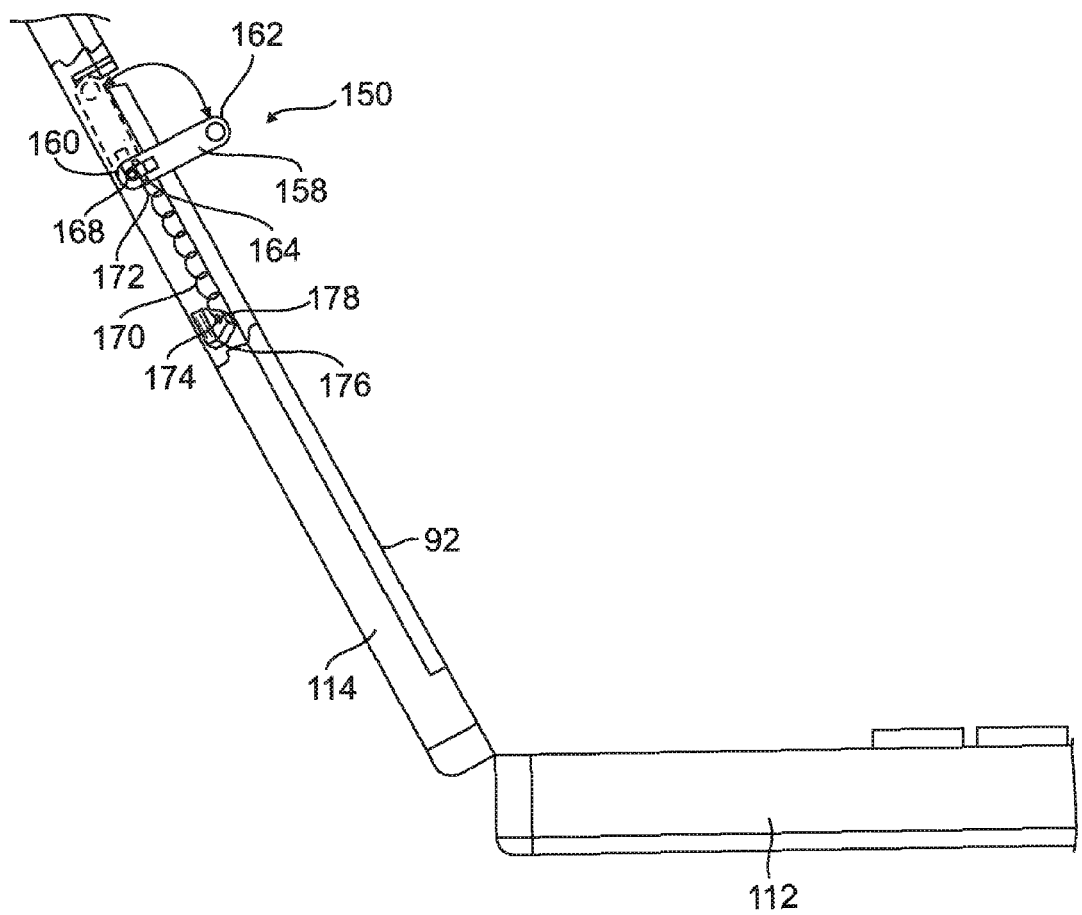
FIG. 13 illustrates a sectional side view of a second exemplary embodiment of an alignment tool according to the present invention.

FIGS. 12 and 13 illustrate a second exemplary embodiment of the alignment tool according to the present invention, designated generally by the numeral 150. This second exemplary embodiment can be supplied as original equipment already attached to the notebook computer 90 on frame 114. Alignment tool 150 may be used in conjunction with a desktop computer as well as with a notebook computer.

Alignment tool 150 includes arm 158 having proximal end 160 and opposed distal end 162. Arm 158 is attached at proximal end 160 to pivot member 168, which is rotatably attached to frame 114 of display 92. Pivot member 168 enables arm 158 to rotate between a an open and closed position, the open position being when arm 158 extends from display 92, and the closed position being defined as when arm 158 is disposed in receptacle 152, which is configured to allow for alignment tool 150 to be contained within frame 114. The closed position is attained when display 92 and keyboard 112 are positioned together for storage and/or transport of notebook computer 90.

Alignment tool 150 includes a first alignment index 154 in frame 114. First alignment index 114 is preferably a slot in frame 114 that is centered along a side wall 98 so that the slot is disposed equidistant from top 100 and bottom 102 of display 98.

Alignment tool 150 also includes a second alignment index 166 extending from distal end 162 of arm 158. In the second exemplary embodiment of the alignment tool according to the present invention, the second alignment index 166 is a pointer.

The position of alignment tool 150 is controlled by 170, which has a first end 172 and a second end 174. First end 172 of spring 170 is attached to arm 158 by means of opening 164. Second end 174 of spring 170 is attached to a lug 176 contained inside frame 114 by means of mounting hole 178. It should be noted that spring 170 may be a tension spring, a compression spring or a torsion spring.

When display 92 and keyboard 112 are placed adjacent each other for storage and or transport, arm 158 is moved so that it is contained in receptacle 152. When the user wants to use notebook computer 90, display 92 and keyboard 112 are moved away from each other and arm 158 is caused to extend from display 92 by the force provided by spring 170. The user uses alignment tool 150 in the same way as in the first exemplary embodiment of the invention by lining up first alignment index 154 and second alignment index 166 with the user's eye so that second alignment index 166 is centered on first alignment index 154.

The foregoing description of exemplary embodiments of the present invention have been presented for purposes of enablement, illustration, and description. It is not intended to be exhaustive of or to limit the present invention to the precise forms discussed. There may be, however, other configurations of alignment tools for use with computer displays not specifically described herein, but with which the present invention is applicable. The present invention should therefore not be seen as limited to the particular embodiment described herein; rather, it should be understood that the present invention has wide applicability with respect to alignment tools for use with a computer display and their manufacture and method of use, particularly with respect to line-of-sight elements assembled together using curved or other shaped components that function in a similar manner to those exemplary embodiments described and illustrated herein. Such other configurations can be achieved by those skilled in the art in view of the description herein. Accordingly, the scope of the invention is defined by the following claims.

What is claimed is:

1. An alignment tool for use with the display of a computer, said display having a display screen, a frame, a pair of opposed display screen sides, a display screen top and a display screen bottom, said alignment tool comprising:
   an interface portion for engaging said display;
   an alignment portion attached to said interface portion, wherein said alignment portion further comprises:
      a generally rectangular first planar element having a pair of opposed sides, a first end and an opposed second end connected by said sides;
      a generally rectangular second planar element having a pair of opposed sides, a first end and an opposed second end connected by said sides, said first end of said second planar element attached to second end of said first planar element and
      a third planar element having a pair of sloped converging sides, a first end and an opposed second end connected by said sides, said first end of said third planar element attached to said second end of said second planar element;
   a first alignment index disposed on said alignment tool, said first alignment index disposed in said first planar element; and
   a second alignment index disposed on said alignment tool, said second alignment index attached to said second end of said third planar element.

2. The alignment tool according to claim 1, wherein said second planar element is disposed perpendicular to said first planar element.

3. The alignment tool according to claim 1, wherein said third planar element is disposed perpendicular to said second planar element.

4. The alignment tool according to claim 1, wherein said first planar element and said third planar element are disposed parallel to each other.

5. The alignment tool according to claim 1, wherein said first alignment index is a slot extending through said first planar element.

6. The alignment tool according to claim 5, wherein said first alignment index is disposed equidistant from said display screen top and said display screen bottom, and said alignment tool is centered on one of said sides.

7. The alignment tool according to claim 1, wherein said second alignment index is a pointer extending from said second end of said third planar element.

8. An alignment tool for use with the display of a computer, said display having a display screen, a frame, a pair of opposed display screen sides, a display screen top and a display screen bottom, said alignment tool comprising:

an alignment arm having a proximal end and a distal end;
a pivot member attached to said proximal end of said alignment arm and rotabably attached to said frame;
a first alignment index disposed in said frame;
a second alignment index extending from said distal end of said alignment arm; and
a receptacle in said frame, said receptacle configured to contain aid alignment arm and said second alignment index.

9. The alignment tool according to claim 8, wherein said first alignment index is a slot.

10. The alignment tool according to claim 8, wherein said second alignment index is a pointer.

11. The alignment tool according to claim 8, further comprising a spring to pivot said pivot member.

12. The alignment tool according to claim 11, further comprising a lug mounted inside said frame, said spring having a first end and a second end, said first end attached to said alignment arm, and said second end attached to said lug.

* * * * *